United States Patent [19]

Beggs et al.

[11] Patent Number: 4,775,740

[45] Date of Patent: * Oct. 4, 1988

[54] FIRE AND HEAT RESISTANT LAMINATING RESIN BASED ON MALEIMIDO AND CITRACONIMIDO SUBSTITUTED 1-[DIORGANOOXYPHOSPHONYL)-METHYL]-2,4- AND -2,6-DIAMINOBENZENES

[75] Inventors: James M. Beggs, Washington, D.C.; John A. Mikroyannidis, Patras, United Kingdom; Demetrius A. Kourtides, Gilroy, Calif.

[73] Assignee: The United States of America as represented by the Administrator of the National Aeronautics and Space Administration, Washington, D.C.

[*] Notice: The portion of the term of this patent subsequent to May 2, 2003 has been disclaimed.

[21] Appl. No.: 852,461

[22] Filed: Apr. 10, 1986

Related U.S. Application Data

[60] Division of Ser. No. 641,147, Aug. 16, 1984, Pat. No. 4,670,565, which is a continuation-in-part of Ser. No. 522,629, Aug. 12, 1983, abandoned.

[51] Int. Cl.$^4$ ............................................. C08G 73/10
[52] U.S. Cl. ...................................... 528/321; 528/72; 528/73; 528/220; 528/228; 528/322; 528/353
[58] Field of Search ............... 528/321, 322, 220, 228, 528/352, 72, 73

[56] References Cited

U.S. PATENT DOCUMENTS 4,587,324 5/1986 Mikroyannidis et al. ........... 528/337

Primary Examiner—Harold D. Anderson
Attorney, Agent, or Firm—Darrell G. Brekke; John R. Manning; Charles E. B. Glenn

[57] ABSTRACT

The subject invention pertains to a novel class of fire- and heat-resistant bisimide resins prepared by thermal polymerization of maleimido or citraconimido substituded 1-[(dialkoxyphosphonyl)-methyl]-2-4 and -2,6-diaminobenzenes. Typical polymer presursors have the chemical structure:

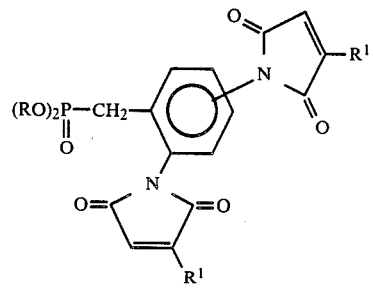

wherein R is alkyl, substituted alkyl or aryl, and R$^1$ is hydrogen or lower alkyl.

The polymer precursors are prepared by reacting 1-[(diorganooxyphosphonyl)methyl]-2-4 and -2,6-diaminobenzenes with maleic anhydride or citraconic anhydride in a mole ratio 1:2. Chains extension of the monomers is achieved by reacting the mono-N-maleimido derivatives of 1-[(diorganooxyphosphonyl)methyl]-2,4 and -2,6-diaminobenzenes with aryl tetracarboxylic dianhydrides, such as benzophenone tetracarboxylic diandydride, or aryl diisocyanates, such as methylenebis(4-phenylisocyanate), in a mole ratio 2:1. The polymerization of the monomers is studied by differential scanning calorimetry (DSC) and the thermal stability of the polymers is ascertained by thermogravimetric analysis (TGA).

9 Claims, 1 Drawing Sheet

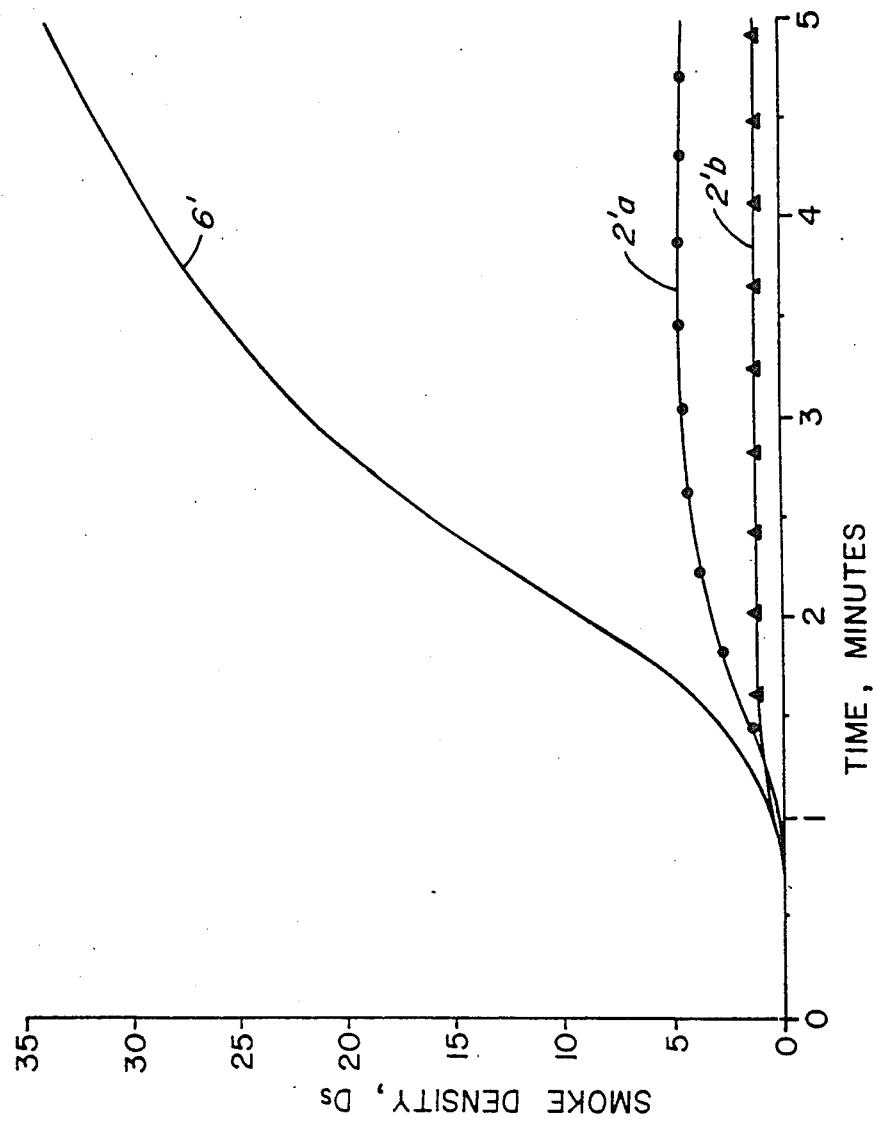

FIRE AND HEAT RESISTANT LAMINATING RESIN BASED ON MALEIMIDO AND CITRACONIMIDO SUBSTITUTED 1-[DIORGANOOXYPHOSPHONYL)-METHYL]-2,4- AND -2,6-DIAMINOBENZENES

ORIGIN OF THE INVENTION

The invention described herein was made in the performance of work under a NASA contract and is subject to the provisions of Section 305 of the National Aeronautics and Space Act of 1958; Public Law 85-568 (72 Stat. 435; 42 U.S.C 2457).

RELATED APPLICATIONS

This application which is a divisional application of application Ser. No. 641,147, now U.S. Pat. No. 4,670,565, issued June 2, 1987, and is related to U.S. Pat. No. 4,675,379, issued June 23, 1987, both of which are continuation-in-part applications of our application Ser. No. 522,629, filed Aug. 12, 1983 now abandoned, which are all directed, to compounds and polymers having

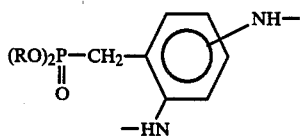

repeating units, and is incorporated herein by reference. This application is also related to the following commonly assigned patent applications: U.S. Ser. No. 641,152, filed Aug. 16, 1984, which is directed to the above compounds and polymers; U.S. Ser. No. 641, 142, filed Aug. 16, 1984, now U.S. Pat. No. 4,587,324, which is directed to the above mentioned compounds and polymers; U.S. Ser. No. filed Aug. 16, 1984, which is directed to polyimides and copolyimides prepared from the present diaminobenzenes; and U.S. Ser. No. 641,143, now U.S. Pat. No. 4,536,565, filed Aug. 16, 1984, which is directed to polyamides and copolyimides from the present diaminobenzenes, all of which are pending.

BACKGROUND OF THE INVENTION

1. Field of the Invention

The invention relates to fire- and heat-resistant bisimide resins obtained by thermal polymerization of maleimido or citraconimido derivatives of 1-[(diorganooxyphosphonyl)methyl]-2,4- and -2,6- diaminobenzenes.

2. Description of the Art

High temperature resistant polymers are used extensively in advanced aerospace structures in which structural integrity must be retained during continuous use at temperatures of 325° C. and above. The stringent requirements of space technology and of other industrial applications for thermal protective materials have led to the development of several classes of heat- and fire-resistant heterocyclic polymers. Aromatic polyimides have met these requirements to a large extent and are obtained by condensation reactions. However, the loss of desirable mechanical properties and problems of reproducibility have been observed because of the voids created by the elimination of water or difficulty in the removal of the high-boiling-point solvent or both. As a result, the use of these polyimides as laminating resins or for adhesives has been limited.

Initial attempts to overcome these processability problems led to the development of addition polyimides based on short, preimidized segments which polymerize thermally through end groups without loss of volatiles. However, these polymers were found to be inherently brittle because of the extensive cross-linking which occurs during polymerization. Several amine-capped liquid elastomeric prepolymers reacted with bismaleimides to produce polymers. See for example, P. Kovacic, U.S. Pat. No. 2,818,405; Chem. Abstracts, 52, 5018e (1958). However, these polymers could not be considered heat-resistant.

Several investigations concerning flame retardation of polyimide resins prepared from phosphorous-containing prepolymers, end-capped with reactive maleimido rings, have been recently reported. Bisimide resins based on bis(m-aminophenyl)methylphosphine oxide as well as bisimide and triimide resins based on tris(m-aminophenyl)phosphine oxide have been prepared and tested as a matrix for fiber-reinforced composites. See, for example, U.S. Pat. No. 4,276,344 and I. K. Varma, G. M. Fohlen and J. A. Parker, J. Macromol.Sci-Chem, (1), 39 ff (1983). Some of the polymer precursors show a relatively high curing temperature or yield inherently brittle polymers due to their high cross-linking density. It is desirable to have organic matrix resins with a low curing temperature so as to obtain polymers with reduced brittleness.

Some patents of general interest in this field include the following U.S. Pat. Nos. 3,929,713; 4,269,961; 4,107,153; 4,276,344; 4,283,522; and 4,421,820.

Some references of the inventors, which describe fire resistant compositions of phosphorus-containing polymers and the monomers thereof, include the following:

1. J. A. Mikroyannidis and D. A. Kourtides, "Fire-Resistant Compositions of Epoxy Resins with Phosphorus Compounds", Symposium on Rubber-Modified Thermoset Resins, 186th Annual American Chemical Society Meeting, Washington, D.C., Abstract PMSE 133, Aug. 28 - Sept. 2, 1983;

2. J. A. Mikroyannidis and D. A. Kourtides, "Fire-Resistant Epoxy Resins Containing 1-(Di(2-Chloroethoxy phosphinyl) Methyl)-2,4- and 2,6 Diaminobenzene as Curing Agent", Proceedings of the 12th North American Thermal Analysis Society Conference, Williamsburg, Va. (Sept. 1983);

3. J. A. Mikroyannidis and D. A. Kourtides, "Curing of Epoxy Resins with 1-[Di(2-Chloroethoxyphosphinyl)Methyl]-2,4- and 2,6-Diaminobenzene", Journal of Applied Polymer Science, Vol. 29, pp. 197–209, (1984);

4. J. A. Mikroyannidis and D. A. Kourtides, "Curing of Epoxy Resins with 1-[Di(2-Chloroethoxyphosphinyl)Methyl]-2,4- and 2,6-Diaminobenzene", National Aeronautics and Space Administration Report No. TM 84350, October 1983;

5. J. A. Mikroyannidis and D. A. Kourtides, "Synthesis and Characterization of Phosphorus-Containing Polyamides and Copolyamides based on 1-[Dialkoxyphosphinyl)Methyl]-2,4- and -2,6-Diaminobenzenes", Journal of Applied Polymer Science, Vol. 29, pp. 941–953 (1984);

6. J. A. Mikroyannidis and D. A. Kourtides, "Synthesis and Characterization of Phosphorus Containing Polyamides and Copolyamides Based on 1-[(Dialkoxyphosphinyl) Methyl]-2,4- and -2,6-Diaminobenzenes", Proceedings of the Society for the Advancement of Materials and Process Engineering, Reno, Nev. (April 1984); and 7. J. A. Mikroyannidis and D. A. Kourtides, "Curing of Epoxy Resins with 1-[Di(2-Chloroethoxyphosphinyl)Methyl]-2,4- and -2,6-Diaminobenzene", Proceedings of the Society of Plastics Industry Annual Spring Meeting, St. Louis, Mo. (May 1984).

These references of the inventors are not considered to be prior art concerning the present invention.

OBJECTS OF THE INVENTION

It is an object of the present invention to provide novel phosphorous- or phosphorous and chlorine-containing maleimido and citraconimido end-capped monomers which have a relatively low melting temperature and can polymerize at moderate temperatures to produce rigid bisimide resins without elimination of volatiles or formation of voids.

It is a further object of the invention to provide polymer precursors soluble in solvents such as methyl ethyl ketone (MEK), dimethyl ketone (acetone), and tetrahydrofuran (THF) which are very suitable and often referred as "varnish" solvents for composite fabrication. Moreover, molten polymer precursors may be used as adhesives without utilization a solvent due to their low melting temperature and the higher polymerization temperature.

It is a further object of the invention to provide bisimide resins obtained by thermal polymerization of monomers which are improved with respect to one or more of the properties limiting oxygen index (LOI), char yield and smoke evolution. They are useful for purposes such as, for example, lamination which combine good fire- and heat-resistance with good mechanical properties, for composites and laminates for use in aircraft structures.

It is a further object of the invention to provide bisimide resins with reduced brittleness. For this purpose the formula weight and the length of the bridge between the two maleimido groups was increased by incorporation of benzophenone tetracarboxylic dianhydride or methylenebis(4-phenylisocyanate) as a building unit of this bridge. The chain extension of monomers is expected to reduce brittleness of the bisimide resins, since larger polymer segments would be available for internal motions after crosslinking. It is an additional object to produce rigid polymers having a reduced number of voids, as compared to polymers prepared from diorganooxy (phosphonyl)methyl diaminobenzene.

BRIEF DESCRIPTION OF THE DRAWING

The invention is further described with relevence being made to the accompanying drawing wherein FIG. 1 is a graph illustrating the reduced smoke evolution of some polymers which results from practicing the present invention.

BRIEF SUMMARY OF THE INVENTION

In accordance with the invention various polymer monomers or precursors are based on maleimido or citraconimido substituted 1-[(diorganooxyphosphonyl)methyl]-2,4- and -2,6-diaminobenzenes of the formula:

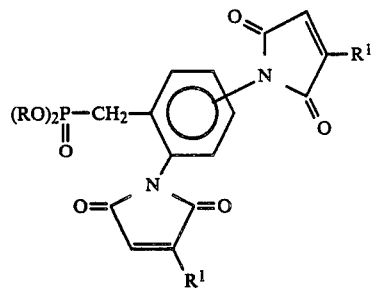

wherein R is an organo group selected from alkyls, substituted alkyls and aryls; and $R^1$ is hydrogen or lower alkyl. These monomers are thermally copolymerized with dianhydrides and diisocyanates to produce fire- and heat-resistant polymers which are used as laminating resins, without the elimination of volatiles or formation of voids. The polymers combine one or more properties of heat-resistance low flammability, high char yield, low smoke evolution, reduced brittleness and good mechanical properties.

DETAILED DESCRIPTION OF THE INVENTION

The starting material of the present invention is a mixture of 1-[(diorganooxyphosphonyl)methyl]-2,4 and -2,6-diaminobenzenes 1.

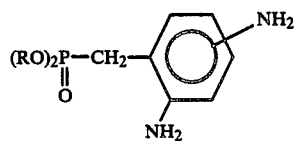

This mixture is a consequence of the method of synthesis (See Examples 1 to 4 below) and the 2,4-diamino isomer predominates. It is unnecessary for purposes of the present invention to separate the isomers. Compounds 1, though a mixture, will referred to as a compound having the chemical structure of the predominant 2,4-diamino isomer. R is an alkyl, substituted alkyl or aryl group. Examples of R are methyl, ethyl, n- and iso-propyl, higher (e.g., C4 to C10) alkyl, haloalkyl, especially chloroalkyl such as 2-chloroethyl; and aromatic groups, such as phenyl, substituted phenyl, naphthyl, e.g., tolyl, etc. Ethyl and 2-chloroethyl groups are preferred, e.g., Compounds 1a and 1b.

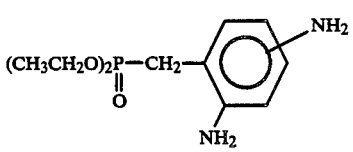

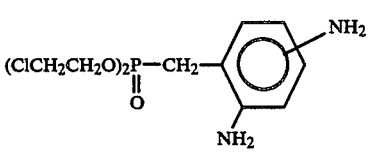

The diamines 1 may be prepared as described in the related application (ARC-11425-2) referred to above. Briefly stated, a 1-[(diorganooxyphosphonyl)methyl]- benzene, $(RO)_2P(O)CH_2C_6H_5$, is nitrated by a mixture of fuming nitric and sulfuric acid to the corresponding dinitro derivatives which are then reduced by catalytic hydrogenation to the diamino species 1. 1-[(Diethoxyphosphonyl)methylbenzene and 1-[(di-2-chloroethoxyphosphonyl)methyl]benzene, both of which are known compounds, are used as starting materials for preparing the diamines 1a and 1b respectively.

The subject invention pertains to the synthesis of N-maleimido or N-citraconimido derivatives of diamines 1, which may be thermally polymerized. More particularly, the polymer precursors 2:

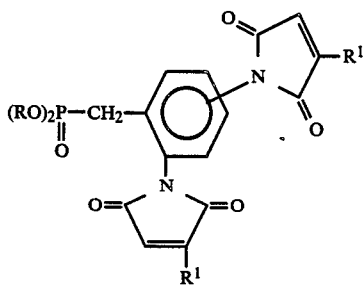

2 where
2a: $R=CH_2CH_3$; $R^1=H$
2b: $R=CH_2CH_2Cl$; $R^1=H$ are synthesized by condensation of diamines 1 (1 mol) with an anhydride, such as maleic anhydride (2 mol), where $R^1$ is hydrogen. Intermediate bismaleamic acid is cyclodehydrated "in situ" with acetic anhydride using sodium acetate as catalyst in boiling acetone. (Examples 5 and 6).

Similarly, the polymer precursors 3 where Compound 3a ($R=CH_2CH_3$ and $R^1=CH_3$) and Compound 3b ($R=CH_2CH_2Cl$ and $R^1=CH_3$) are synthesized by condensation of diamines 1 with an anhydride of the formula

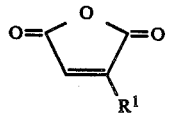

where $R^1$ is alkyl having one to six carbon atoms, e.g., methyl, where citraconic anhydride is used (See Examples 7 and 8).

The above methods produce a diamine/anhydride combining about one equivalent of diamine with about two equivalents of anhydride. That is to say, more than twice as much dianhydride per diamine on an equivalent basis is required to obtain compounds 2, 2a, 2b, 3a and 3b and the like.

If a polymer precursor having a free amine is desired, then a diamine such as 1 and an anhydride are combined in about a 1:1 equivalent ratio. That is to say, 1-[(Diorganooxyphosphonyl)methyl] benzene maleimide of the formula:

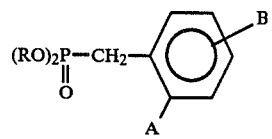

is thus produced, where R is an organo group selected from alkyls, substituted alkyls and aryls; A is a $-NH_2$ or a

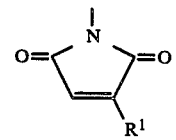

group and B is the other group; where $R^1$ is hydrogen or lower alkyl, and A and B are in the 2,4 or 2,6-positions (See Examples 11 and 12). Preferred embodiments of these monomaleimides are those where R is ethyl or 2-chloroethyl, and $R^1$ is hydrogen or methyl.

Chain extension of the phosphonyl group connecting the two maleimido groups is accomplished by reaction with an aryl tetracarboxylic dianhydride

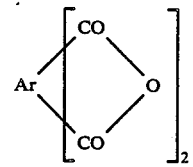

where Ar is a tetravalent aromatic group containing from 6 to 20 carbon atoms. Thus, Ar may be a substituted aryl group, phenyl, naphthyl, phenanthryl, benzophenonyl and the like. Preferred embodiments of the present invention include benzophenone tetracarboxylic dianhydride and pyromellitic dianhydride. Chain extension also includes aryl, alkylene and arylalkylene diisocyanates of the formula $OCN-R^2-NCO$, where $R^2$ is a disubstituted aryl, such as phenyl, naphthyl; alkylene such as ethylene, pentylene, hexylene; or arylalkylene, such as methylenebisphenyl and the like. Preferred embodiments of the present invention include 1,3-phenylene diisocyanate, methylene bis(4-phenyl isocyanate), 2,4-toluene diisocyanate and the like.

The polymerization of the dianhydrides may be considered to be a two-stage polycondensation method. The first stage of the condensation is carried out in a solvent. The formation of the bismaleimidic acid is exothermic and is carried out at ambient temperature or slightly above. Under these conditions the extent of cyclodehydration is negligible.

Dehydration, the second stage of the imidization process can be carried out by thermal or chemical means. After removal of the solvent the thermal process involves heating the polymer at about 280° C. in a vacuum for 2 hr. The chemical means includes azeotroping the water of cyclization with benzene or refluxing in acetic anhydride with sodium acetetate as catalyst. The completion of the cyclization is ensured by heating the polymers at about 200° C. in a vacuum oven for two hours (See Examples 5 and 9).

Specifically, in the first stage the polymer precursors 4:

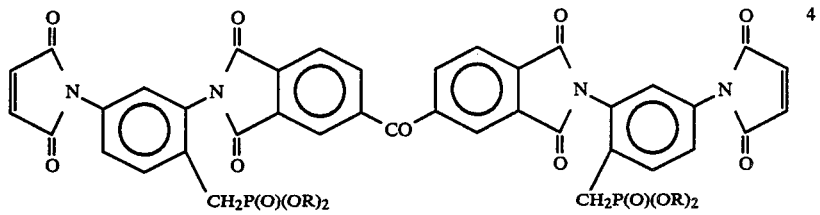

where 4a: R = CH₂CH₃
4b: R = CH₂CH₂Cl were synthesized by reacting diamines 1 with an equimolar amount of maleic anhydride to yield the corresponding maleimido acids. The latter reacted subsequently with benzophenone tetracarboxylic dianhydride in a mole ratio 2:1 and finally was cyclodehydrated using acetic anhydride and sodium acetate (Examples 9 and 10).

Overall the polymerization of dianhydride and Compound 2 may be summarized as is shown in the sequence below:

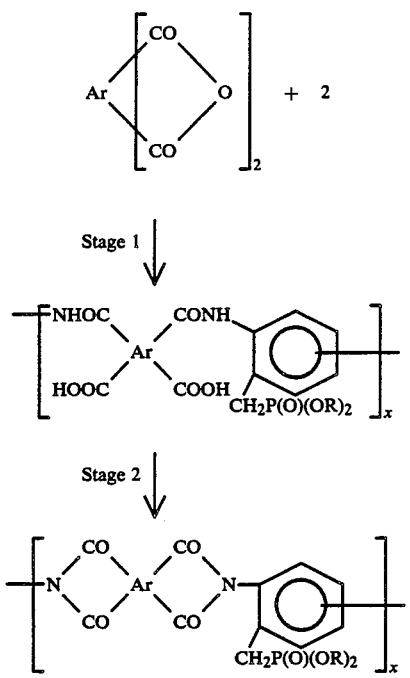

where Ar and R are defined hereinabove and x is a positive integer. An embodiment is "x" between 1 and 1000 and a preferred embodiment is "x" between 10 and 100.

In an analogous manner, the polymer precursors 5:

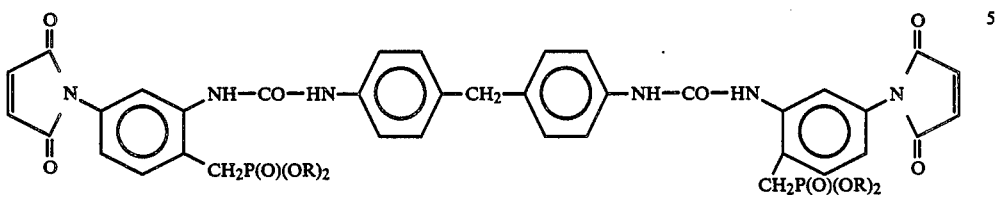

where
5a: R=CH₂CH₃
5b: R=CH₂CH₂Cl were synthesized by reacting an aryl diisocyanate, OCN-Ar-NCO such as methylenebis(4-phenylisocyanate), with the mono-N-maleimides of diamines 1 (Examples 11 and 12).

Overall the polymerization of diisocyanate and Compound 1 may be summarized as is shown in the sequence below having the bracketed recurring unit:

OCN—R²—NCO + 2

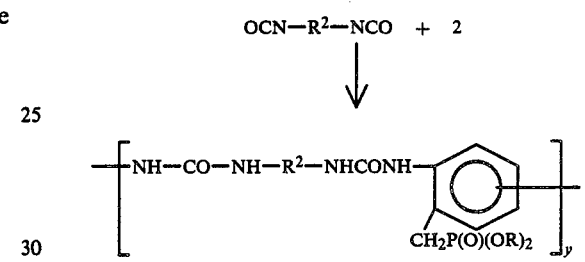

where R and R² are defined hereinabove. "y" is a positive integer. An embodiment of the present invention is "y" between 1 and 1000. A preferred embodiment is "y" between 10 and 100.

In all cases of polymer precursors the diamino moiety is shown as the 2,4-diamino compound (which predominates) but it will be understood that the 2,6-diamino compound is also present.

Bisimide resins are prepared by thermal polymerization of the polymer precursors. The polymerization behavior of the polymer precursors was analyzed and determined by differential scanning calorimetry (DSC) in nitrogen atmosphere. The results are listed in Table 1. In this Table, $T_1$ is the temperature of first energy release (start of polymerization), $T_2$ is the temperature of exothermic peak position, and $T_3$ is the temperature of termination of polymerization. m-Phenylenebismaleimide, which is a conventional polymer precursor, is shown in this table as Experiment Number 6.

The thermal polymerization of the polymer precursors is achieved by heating them into an air draft oven at 180° C. for about 20 min until molten and subsequently at 230° C. for 2 hr.

The thermal stability of the polymers is ascertained by thermogravimetric analysis (TGA) both in N₂ and air atmosphere. The results are shown in Table 2. The polymers obtained from the precursors 2, 3, 4, 5 and 6 by the thermal process mentioned above are referred to by the numbers 2', 3', 4', 5' and 6' respectively. PDT is the polymer decomposition temperature, $PDT_{max}$ is the maximum polymer decomposition temperature, and TCP is the temperature of complete pyrolysis. As is seen from Table 2, char yield is substantially greater with the phosphorus-containing polymers of the present invention than with conventional polymer (Polymer 6').

Table 3 sets forth data demonstrating superior fire-resistance of some polymers. In this Table, LOI is the limiting oxygen index determined according to the ASTM D 2863-74 method. LOI value indicates resistance to ignition. As is seen in Table 3 the LOI values of polymers of the invention are substantially greater than that of comparable Polymer 6'. The smoke density is determined according to the test method described by National Fire Protection Assoc., Bull. No. NFPA 258-T (1974). FIG. 1 shows the smoke density (Ds) value of smoke evolved from some polymers under flaming conditions (heat flux=3.3 W/cm$^2$) as a function of the irradiation time. The smoke density value indicates the flammability. As will be seen from Table 3 as well as from FIG. 1, the polymers of the present invention show a substantially lower smoke density than the conventional polymer 6'.

The following examples will serve to illustrate the practice and advantages of the invention, and are not to be construed as limiting the scope of the invention. Examples 1 to 4 illustrate the preparation of diamines 1. Examples 5 to 12 illustrate the preparation of the polymer precursors.

The structure of the polymer precursors is confirmed by elemental analysis, proton nuclear magnetic resonance ($^1$H-NMR) and infrared spectroscopy (IR) and by gas chromatography-mass spectroscopy (GCMS). Melting temperatures of most of the polymer precursors synthesized were not recorded by the standard test methods because they did not show a clear melting point, probably due to the formation of crossbonds on gradual heating of these compounds.

EXAMPLE 1

1-[(Diethoxyphosphonyl)methyl]-2,4- and -2,6-dinitrobenzenes

1-[(Diethoxyphosphonyl)methyl]benzene (21.76 g, 95 mmol) was added dropwise to a mixture of fuming nitric acid (16.3 g) and fuming sulphuric acid (54.30 g), containing 30% 20$_3$, at 55° C. The addition of the phosphonate lasted 1 hr and subsequently the mixture was heated at the same temperature for another hour. The mixture was poured into 1 liter of ice water and extracted with chloroform (300 ml). The chloroform solution was washed with 5% NaHCO$_3$ solution and with water, dried (Na$_2$SO$_4$) and concentrated to give a yellowish solid (24.16 g, 80%, mp 78°-82° C.). Recrystallizations from ether-chloroform (10:1 vol/vol) gave an analytical sample; mp 101°-104° C. The structure was confirmed by $^1$H-NMR and chemical analysis.

EXAMPLE 2

1-[(Diethoxyphosphonyl)methyl]-2,4- and -2,6-diaminobenzenes, 1a

The recrystallized product of Example 1 (2.00 g, 6.28 mmol) was dissolved in 50 ml of absolute ethanol and a small amount of catalyst, 10% palladium on carbon, was added. The hydrogenation was carried out on a Parr apparatus under a pressure of 3.5 atm at room temperature until no more hydrogen was taken up (about 3 hrs.).

After the filtration of the catalyst and the removal of the volatile components under vacuum a viscous undistillable liquid was obtained (1.57 g. 97%), which could not be induced to crystallize. The dihydrochloride salt was formed by passing anhydrous hydrochloride gas through its solution in chloroform. This salt was a nearly white solid and after recrystallizations from ethanol-ether (1:6 vol/vol) an analytical sample was obtained which was decomposed at temperature higher than 128° C. Structure was confirmed by $^1$H-NMR and chemical analysis.

EXAMPLE 3

1-[(Di-2-chloroethoxyphosphonyl)methyl]-2,4- and -2,6-dinitrobenzenes

1-[(Di-2-chloroethoxyphosphonyl)methyl]benzene (5.13 g, 17 mmol) was added dropwise to a mixture of fuming nitric acid (4.0 g) and fuming sulphuric acid (13.0 g), containing 30% SO$_3$ at 55° C. The addition of the phosphonate lasted 0.5 hour and subsequently the mixture was heated at the same temperature for 4 hours longer. The mixture was poured into 300 ml of ice water and extracted with chloroform (150 ml). The chloroform solution was washed with 5% sodium bicarbonate solution and with water, dried (sodium sulfate) and concentrated to give a viscous liquid (4.92 g) diluted with about 100 ml of acetone-ether (1:10 vol/vol). Upon cooling of the solution the title product was crystallized (2.80 g, 42%, mp 79°-84° C.). Recrystallizations from acetoneether (1:10 vol/vol) gave an analytical sample: mp 83°-85° C. Structure was confirmed by $^1$H-NMR and chemical analysis.

EXAMPLE 4

1-[(Di-2-chloroethoxyphosphonyl)methyl]-2,4- and 2,6-diaminobenzenes, 1b

Recrystallized product of Example 3 (2.27 g, 58.6 nmol) was dissolved in 40 ml of absolute ethanol and a small amount of catalyst, 10% palladium on carbon, was added. The hydrogenation was carried out as in Example 2. A solid product was obtained (1.88 g, 98%, mp 105°-109° C.). Recrystallizations from benzene gave an analytical sample: mp 116°-119° C. Structure was confirmed $^1$H-NMR and chemical analysis.

EXAMPLE 5

Bismaleimide, 2a

To a vigoruorsly stirred solution of 1a (7.37 g, 28.5 mmol) in acetone under nitrogen atomsphere, granular maleic anhydride (6.16 g, 62.8 mmol) was added portionwise so that the temperature was maintained at about 40° C. After stirring at room temperature for about 30 min. the bismaleamic acid was precipitated as a pale yellow solid. Stirring was continued for 1.5 hr. more to complete the reaction. Cyclodehydration of bismaleamic acid to bismaleimide was carried out by adding acetic anhydride and fused sodium acetate (300 ml and 27 g respectively per mole of maleic anhydride) to the reaction mixture and refluxing for 2 hr. The suspension became a brown solution during the first 15 min. of refluxing. Most of the acetone was evaporated at the end of the reaction. The mixture was poured into ice water and extracted by chloroform. The layer of chloroform was subsequently washed by a 5% aqueous solution of NaHCO$_3$, followed by water and then dried, (MgSO$_4$) The concentrate obtained after removing of volatile components using a rotary evaporator was dried in a vacuum oven at about 50° C. overnight. Bismaleimide 2a was obtained as a brown solid (10.96 g, 92%) and purified from tetrahydrofuran/ether.

EXAMPLE 6

Bismaleimide, 2b

A mixture of diamine 1b (4.01 g, 12.3 mmol) and maleic anhydride (2.64 g, 27.0 mmol) reacted as described in Example 5. The yield of the reaction was 94% (5.63 g).

EXAMPLE 7

Biscitraconimide, 3a

Biscitraconimide 3a was prepared by reacting diamine 1a (4.34 g, 16.8 mmol) with citraconic anhydride (4.14 g, 37.0 mmol) as in Example 5. The yield of the reaction was 91% (6.82 g).

EXAMPLE 8

Biscitraconimide, 3b

A mixture of diamine 1b (3.90 g, 11.9 mmol) and citraconic anhydride (2.94 g. 26.2 mmol) reacted as in Example 5. Biscitraconimide 3b was obtained with a yield 93% (5.70 g).

EXAMPLE 9

Polymer, 4a

Maleic anhydride (1.62 g, 16.6 mmol) was added portionwise to a stirred solution of diamine 1a (3.89 g, 15.1 mmol) in acetone under nitrogen atmosphere. After stirring for 2 hr, 3,3′, 4,4′-benzophenonetetracarboxylic dianhydride (2.43 g, 7.5 mmol) was added to the solution and stirring was continued at ambient temperature for 2 hr longer. To the continuously stirred solution of polyamide carboxylic acid, acetic anhydride and fused sodium acetate (300 ml and 27 g respectively per mole of water condensed) were added and acetone was allowed to reflux for 2–3 hr. The reaction mixture was poured into ice water, extracted with chloroform and the layer of chloroform was washed with a 5% aqueous solution of $NaHCO_3$ subsequently with water and dried with $MgSO_4$. Upon concentration in a rotary evaporator, bismaleimide 4a was obtained as a brown solid (5.41 g, 75%) and purified from tetrahydrofuran/ether.

EXAMPLE 10

Polymer, 4b

Diamine 1b (2.01 g, 6.2 mmol) and maleic anhydride (0.66 g, 6.8 mmol) were dissolved in acetone and the solution was stirred under nitrogen atmosphere for 2 hr. 3,3′, 4,4′-Benzophenone tetracarboxylic dianhydride (0.99 g, 3.1 mmol) was added to the solution and stirring was continued for 2 hr more. Cyclodehydration and isolation of the polymer 4b was carried out as in Example 9. The yield of the reaction was 72% (2.46 g).

EXAMPLE 11

Polymer, 5a

Diamine 1a (8.27 g, 32.0 mmol) reacted with maleic anhydride (3.45 g, 35.2 mmol) according to the procedure described in Example 5 to yield the mono-N-maleimido derivative of 1a.

Methylenebis(4-phenylisocyanate) (4.00 g, 16.0 mmol) dissolved in acetone was rapidly added to a vigorously stirred solution of mono-N-maleimido derivative of 1a in acetone under nitrogen atomsphere. After subsiding, the exothermic reaction the mixture was heated to 50°–60° C. for 1 hr. Polymer 5a (12.16 g, 82%) was precipitated adding ether to the reaction mixture and purified from acetone/ether.

EXAMPLE 12

Polymer 5b

The mono-N-maleimido derivative of 1b was prepared by reacting diamine 1b (4.25 g, 13.0 mmol) with maleic anhydride (1.40 g, 14.3 mmol) as in Example 5.

To a vigorously stirred solution of the mono-N-maleimido derivative of 1b in acetone, methylenebis (4-phenylisocyanate) (1.62 g, 6.5 mmol) was rapidly added under nitrogen atmosphere. After the exothermic reaction subsided, the mixture was heated to 50°–60° C. for 1 hr. Polymer 5b (5.95 g, 86%) was precipitated by adding ether to the reaction mixture and purified from acetone/ether.

TABLE 1

Characteristic DSC Temperatures of Bisimides

| Compound | $T_1$ (°C.) | $T_2$ (°C.) | $T_3$ (°C.) |
|---|---|---|---|
| 2a | 200 | 233 | 282 |
| 2b | 180 | 224 | 260 |
| 6 | 205 | 249 | 326 |
| 3a | 178 | 240 | 288 |
| 3b | 168 | 236 | 256 |
| 4a | 216 | 241 | 292 |
| 4b | 180 | 210 | 248 |
| 5a | 140 | 275 | 300 |
| 5b | 130 | 259 | 320 |

TABLE 2

Thermal Stability of Polymers

| Polymer | In Nitrogen | | | | In Air | | | |
|---|---|---|---|---|---|---|---|---|
| | PDT (°C.) | $PDT_{max}$ (°C.) | TCP (°C.) | Char Yield 700° C. % | PDT (°C.) | $PDT_{max}$ (°C.) | TCP (°C.) | Char Yield 700° C. % |
| 2′a | 386 | 433 | 495 | 66 | 378 | 433 | 455 | 62 |
| 2′b | 314 | 428 | 478 | 63 | 292 | 365 | 450 | 57 |
| 6′ | 457 | 508 | 560 | 51 | 445 | 497 | 536 | 4 |
| 3′a | 408 | 456 | 500 | 69 | 400 | 452 | 495 | 65 |
| 3′b | 393 | 447 | 485 | 70 | 379 | 436 | 480 | 58 |
| 4′a | 388 | 474 | 520 | 68 | 375 | 460 | 495 | 56 |
| 4′b | 309 | 466 | 490 | 61 | 300 | 390 | 483 | 51 |
| 5′a | 334 | 369 | 512 | 63 | 325 | 353 | 487 | 46 |
| 5′b | 331 | 394 | 490 | 58 | 329 | 384 | 468 | 35 |

TABLE 3

Limiting Oxygen Index and Smoke Density of Some Polymers*

| Polymer | Phosphorus (%) | LOI | Smoke Density |
|---|---|---|---|
| 2′a | 7.51 | 48.3 | 4.4 |
| 2′b | 6.30 | 71.6 | 1.1 |

TABLE 3-continued

Limiting Oxygen Index and
Smoke Density of Some Polymers*

| Polymer | Phosphorus (%) | LOI | Smoke Density |
|---|---|---|---|
| 6' | 0 | 41.0 | 34.0 |

*At a heat flux of 3.3 w/cm² and for an irradiation time of 5 min.

While the present invention has been described with reference to specific embodiments thereof, it will be understood by those skilled in this art that various changes may be made and that equivalent steps may be substituted without departing from the true spirit and scope of the present invention. All such modifications or changes are intended to be included within the scope of the following claims.

We claim:

1. A polymer having the recurring unit:

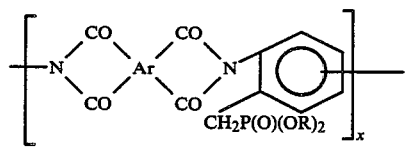

wherein:

Ar is a tetravalent aromatic group containing from 6 to 20 carbon atoms;
R is independently selected from alkyls having from 1 to 10 carbon atoms, halogenated alkyls or aryls;
x is between 1 and 1000; and the linkage:

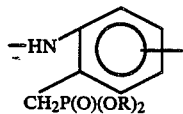

is in the 4-position, the 6-position, or both the 4-position and the 6-position relative to the (phosphonyl) methyl group.

2. The polymer of claim 1 wherein R is ethyl or 2-chloroethyl.

3. The polymer of claim 1 wherein Ar is tetra substituted benzophenone.

4. A polymer having a reduced number of voids, compared to polymers prepared from diorganooxy (phosphonyl) methyl diaminobenzenes, having the recurring unit:

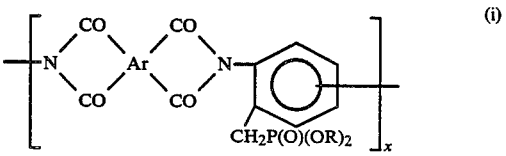

wherein:

Ar is a tetravalent aromatic group containing from 6 to 20 carbon atoms;
R is independently selected from alkyls having from 1 to 10 carbon atoms, halogenated alkyls or aryls;
x is between 1 and 1000; and the linkage:

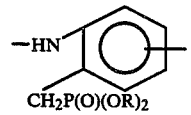

is in the 4-position, the 6-position or both the 4-position and the 6-position relative to the (phosphonyl) methyl group.

5. The polymer of claim 4 wherein said (phosphonyl) methyl group is predominately in the 4-position.

6. The polymer of claim 5 wherein R is alkyl.

7. The polymer of claim 6 wherein R is methyl.

8. The polymer of claim 5 wherein R is halogenated alkyl.

9. The polymer of claim 8 wherein R is 2-chloroethyl.

* * * * *